(12) United States Patent
Kumar et al.

(10) Patent No.: US 11,126,358 B2
(45) Date of Patent: Sep. 21, 2021

(54) DATA MIGRATION AGNOSTIC OF PATHING SOFTWARE OR UNDERLYING PROTOCOL

(71) Applicant: EMC IP Holding Company LLC, Hopkinton, MA (US)

(72) Inventors: Kundan Kumar, Bangalore (IN); Kurumurthy Gokam, Bangalore (IN); Shubham Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 16/220,896

(22) Filed: Dec. 14, 2018

(65) Prior Publication Data
US 2020/0192588 A1    Jun. 18, 2020

(51) Int. Cl.
| | |
|---|---|
| *G06F 12/00* | (2006.01) |
| *G06F 3/06* | (2006.01) |
| *H04L 29/06* | (2006.01) |
| *G06F 11/16* | (2006.01) |
| *G06F 13/42* | (2006.01) |

(52) U.S. Cl.
CPC ............ *G06F 3/0635* (2013.01); *G06F 3/061* (2013.01); *G06F 3/067* (2013.01); *G06F 3/0647* (2013.01); *G06F 11/1662* (2013.01); *G06F 13/4221* (2013.01); *H04L 69/14* (2013.01)

(58) Field of Classification Search
CPC ...... G06F 3/0635; G06F 3/061; G06F 3/0647; G06F 3/067; G06F 11/1662; G06F 13/4221; H04L 69/14
See application file for complete search history.

(56) References Cited

U.S. PATENT DOCUMENTS

| | | |
|---|---|---|
| 5,717,924 A * | 2/1998 | Kawai ................... G06F 16/289 |
| 6,687,746 B1 | 2/2004 | Shuster et al. |
| 6,697,875 B1 | 2/2004 | Wilson |
| | (Continued) | |

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Prasith Thammavong
(74) *Attorney, Agent, or Firm* — Ryan, Mason & Lewis, LLP

(57) ABSTRACT

An apparatus in one embodiment comprises a host device configured to communicate with a storage system. Responsive to an instruction to migrate data from a source volume to a destination volume, the host device replaces an input-output entry function of a source pathing device associated with the source volume with a migration input-output entry function that is configured, in response to receiving an input-output operation, to call an input-output entry function of a destination pathing device associated with the destination volume and to call the input-output entry function of the source pathing device. Responsive to an indication that a migration of data has completed, the host device replaces the migration input-output entry function with a post-migration input-output entry function. The post-migration input-output function is configured to call the input-output entry function of the destination pathing device in response to receiving an input-output operation.

20 Claims, 7 Drawing Sheets

(56) References Cited

U.S. PATENT DOCUMENTS

| | | | |
|---|---|---|---|
| 7,093,088 B1* | 8/2006 | Todd | G06F 11/1415 707/999.202 |
| 7,263,590 B1* | 8/2007 | Todd | G06F 12/02 711/165 |
| 7,415,591 B1* | 8/2008 | Todd | G06F 3/0614 711/165 |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,060,710 B1* | 11/2011 | Don | G06F 3/0617 711/161 |
| 8,335,771 B1* | 12/2012 | Natanzon | G06F 11/2074 707/684 |
| 9,058,119 B1* | 6/2015 | Ray, III | G06F 3/061 |
| 9,176,902 B1* | 11/2015 | Long | G06F 13/14 |
| 9,400,611 B1 | 7/2016 | Raizen | |
| 9,594,780 B1 | 3/2017 | Esposito et al. | |
| 9,778,852 B1 | 10/2017 | Marshak et al. | |
| 10,360,085 B1* | 7/2019 | Mallick | G06F 3/0605 |
| 10,368,150 B1* | 7/2019 | Cai | H04J 3/1658 |
| 10,439,878 B1* | 10/2019 | Tah | H04L 69/40 |
| 10,652,206 B1* | 5/2020 | Pusalkar | G06F 3/0659 |
| 10,678,465 B2* | 6/2020 | Feng | G06F 3/067 |
| 10,789,006 B1* | 9/2020 | Gokam | G06F 3/067 |
| 10,880,217 B2* | 12/2020 | Mallick | H04L 45/24 |
| 11,023,134 B1* | 6/2021 | Rao | G06F 3/061 |
| 2004/0010563 A1 | 1/2004 | Forte et al. | |
| 2004/0141498 A1* | 7/2004 | Rangan | G06F 3/0613 370/380 |
| 2004/0143640 A1* | 7/2004 | Rangan | G06F 3/0613 709/212 |
| 2005/0033878 A1* | 2/2005 | Pangal | G06F 3/0613 710/36 |
| 2006/0277383 A1* | 12/2006 | Hayden | H04L 67/1097 711/170 |
| 2007/0174849 A1 | 7/2007 | Cheung et al. | |
| 2008/0043973 A1 | 2/2008 | Lai et al. | |
| 2008/0091972 A1* | 4/2008 | Tanaka | G06F 11/008 714/5.11 |
| 2010/0313063 A1 | 12/2010 | Venkataraja et al. | |
| 2011/0197027 A1 | 8/2011 | Balasubramanian et al. | |
| 2012/0131289 A1* | 5/2012 | Taguchi | G06F 3/0635 711/162 |
| 2012/0144233 A1* | 6/2012 | Griffith | G06F 11/1443 714/13 |
| 2013/0191590 A1* | 7/2013 | Malwankar | G06F 3/0611 711/114 |
| 2014/0105068 A1 | 4/2014 | Xu | |
| 2016/0117113 A1 | 4/2016 | Li et al. | |
| 2017/0041182 A1* | 2/2017 | Hanko | H04L 49/501 |
| 2017/0228388 A1* | 8/2017 | Venkat | G06F 3/061 |
| 2017/0277646 A1* | 9/2017 | Stankey | G06F 9/4413 |
| 2017/0344259 A1* | 11/2017 | Freyensee | G06F 3/061 |
| 2019/0310790 A1* | 10/2019 | Allen | G06F 3/0647 |
| 2020/0348861 A1* | 11/2020 | Marappan | G06F 3/0665 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. on Dec. 21, 2017 and entitled "Storage System with Input-Output Performance Control Utilizing Application Process Detection."

\* cited by examiner

DATA MIGRATION AGNOSTIC OF PATHING SOFTWARE OR UNDERLYING PROTOCOL

FIELD

The field relates generally to information processing systems, and more particularly to storage in information processing systems.

BACKGROUND

Storage arrays and other types of storage systems are often shared by multiple host devices over a network. A given host device may comprise a multipath input-output (MPIO) driver that is configured to process input-output (IO) operations for delivery from the given host device to the storage system. Data migration techniques are used to move or "migrate" data from one storage volume, e.g., a logical unit (LUN), of a storage system to another for any of a variety of purposes, such as upgrading storage hardware or information lifecycle management. Migration typically involves synchronizing the destination storage volume to the source storage volume, e.g., achieving an operating state in which the destination storage volume stores the same data as the source storage volume, and then switching operation so that subsequent accesses of the data are directed to the target storage volume instead of the source storage volume. Host device downtime or reconfiguration is often required to complete a data migration and perform a final synchronization of the source volume to the destination volume. Once the switching is successfully accomplished, the source storage volume can be taken out of service or put to some other use.

SUMMARY

Illustrative embodiments provide techniques for data migration agnostic of any pathing software or underlying transport protocol.

Requiring host device downtime or reconfiguration to perform the final synchronization of the source volume to the destination volume after a data migration leads to inefficiencies in the host device and in the storage system as a whole since new IO operations will not be processed by that host device during the final synchronization.

Such drawbacks are advantageously overcome in illustrative embodiments by using data migration techniques that migrate data in a manner that is agnostic of any pathing software or underlying transport protocols. For example, in illustrative embodiments, the kernel level IO entry function associated with a source pathing device may be replaced during a data migration with an IO entry function that re-routs incoming IO operations to a destination pathing device associated with the destination volume. Because of this re-routing at the kernel level, the destination volume is already synchronized with the source volume upon completion of the data migration and any new IO operations that were received during the data migration are already included in the destination volume without requiring host device downtime or reconfiguration for the final synchronization.

By using kernel level IO entry functions, the disclosed techniques enable the migration of data from a source volume to a destination volume even when the associated pathing devices use different transport protocols or multipath drivers with little to no host device downtime or reconfiguration.

In one embodiment, an apparatus comprises at least one host device configured to communicate over a network with at least one storage system comprising a source volume and a destination volume. Responsive to an instruction to migrate data from the source volume to the destination volume, the at least one host device is configured to replace an IO entry function of a source pathing device associated with the source volume with a migration IO entry function. The migration IO entry function is configured, in response to receiving an IO operation, to call an IO entry function of a destination pathing device associated with the destination volume and to call the IO entry function of the source pathing device. Responsive to an indication that a migration of data from the source volume to the destination volume has completed, the at least one host device is configured to replace the migration IO entry function with a post-migration IO entry function. The post-migration IO function is configured to call the IO entry function of the destination pathing device in response to receiving an IO operation.

In some embodiments, at least one of the IO entry function of the source pathing device, the IO entry function of the destination pathing device, the migration IO entry function, and the post-migration IO entry function is implemented at a kernel level of the host device.

The host device may be further configured, responsive to the indication that the migration of data from the source volume to the destination volume has completed, to store a relationship between the source pathing device and the destination pathing device in a memory associated with the at least one host device. Responsive to a reboot of the at least one host device, the host device may be further configured to form a link in association with the source pathing device based on the relationship. The link is configured to re-route IO operations targeted at the source pathing device to the destination pathing device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
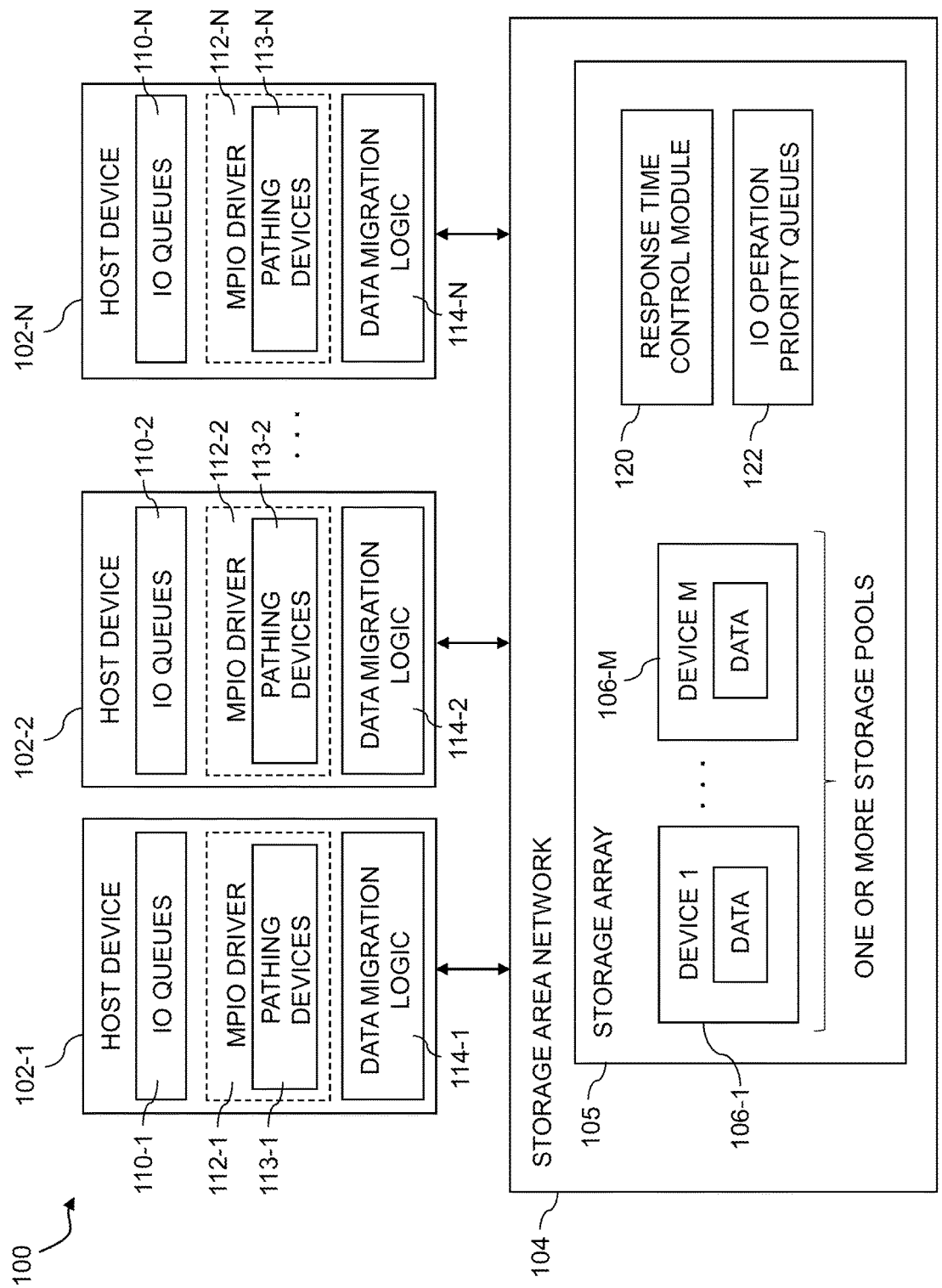
FIG. 1 is a block diagram of an information processing system configured with functionality for data migration agnostic of multipath software or underlying transport protocol in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement LUNs configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective functionality for implementing data migration logic 114-1, 114-2, . . . 114-N. In some embodiments, one or more of the host devices 102 may also optionally comprise respective MPIO drivers, e.g., MPIO drivers 112-1, 112-2, . . . 112-N. The MPIO drivers 112 collectively comprise a multipath layer of the host devices 102.

In illustrative embodiments, the host devices 102 also comprise respective pathing devices 113-1, 113-2, . . . 113-N. Pathing devices 113 are logical devices that comprise information on one or more paths from a host device 102 to a corresponding storage volume such as, e.g., a LUN, of a storage device 106. A pathing device 113 routes received IO operations directed to the corresponding storage volume of the SAN 104 according to the information on the one or more paths to that storage volume. In some embodiments, a pathing device 113 may be included as part of a respective MPIO driver 112 of a host device 102. In some embodiments, the pathing device 113 may be implemented separately from an MPIO driver 112 of a host device 102 or may be implemented on a host device 102 that does not include an MPIO driver 112. In some embodiments, for example, a pathing device 113 of a host device 102 may comprise information on a single path from the host device 102 to a corresponding storage volume of the SAN 104.

In some embodiments, MPIO drivers may group all paths from a host device to a corresponding storage volume such as, e.g., a LUN, into a pathing device 113 for that storage volume, sometimes called a multipath logical device. The individual block devices representing each path are known as native devices. Applications use a multipath logical device for IO operations so that the IO operations may be distributed across all available paths. When paths fail, the MPIO driver will typically redirect the IO operations to other alive paths in the multipath logical device.

The MPIO drivers described herein may comprise, for example, otherwise conventional MPIO drivers, such as PowerPath® drivers from Dell EMC of Hopkinton, Mass., suitably modified in the manner disclosed herein to implement functionality for data migration agnostic of any pathing software or underlying transport protocol. Other types of MPIO drivers from other driver vendors may be suitably modified to incorporate functionality for data migration agnostic of any pathing software or underlying transport protocol as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers 112 of the multipath layer or by the host device 102 as needed in order to discover the addition of new paths or the deletion of existing paths.

A given path discovery scan can be performed utilizing known functionality of conventional MPIO drivers, such as PowerPath® drivers, or by other drivers or software found on a host device 102.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for data migration agnostic of any pathing software or underlying transport protocol. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support data migration agnostic of any pathing software or underlying transport protocol.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support data migration agnostic of any pathing software or underlying transport protocol as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and data migration logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments of the present invention provide techniques for data migration from a source volume of a storage system to a destination volume of the storage system agnostic of the controlling multipath software or the underlying transport protocol (e.g., SCSI or NVMe) used by the respective source and destination pathing devices 113. In some embodiments, the source and destination pathing devices 113 may be multipath logical devices, for example, as described above, that group a number of paths from a host device to a storage volume together. In some embodiments, one or both of the source and destination pathing devices may alternatively be logical devices that provide a single path from the host device to the corresponding storage volume. The disclosed techniques require little to no host device downtime or reconfiguration and enable seamless data migration between at least the following combinations of source and destination pathing devices:

A) A source pathing device 113 that is under control of a first MPIO driver 112 and a destination pathing device 113 that is under control of a second MPIO driver 112 (Multipath to Multipath).

B) A source pathing device 113 that is not under control of a MPIO driver and a destination pathing device 113 that is under control of a MPIO driver 112 (Single path to Multipath).

C) Neither of the source and destination pathing devices 113 are under control of a multipath driver (Single path to Single path).

For any of the above combinations, the source and destination pathing devices may communicate using SCSI, NVMe, or any other transport protocol. For example, in an illustrative embodiment, the source pathing device may communicate using the SCSI transport protocol while the destination pathing device may communicate using the NVMe transport protocol or vice versa. In some embodiments, the source and destination pathing devices may communicate using the same transport protocol.

Figure 2:
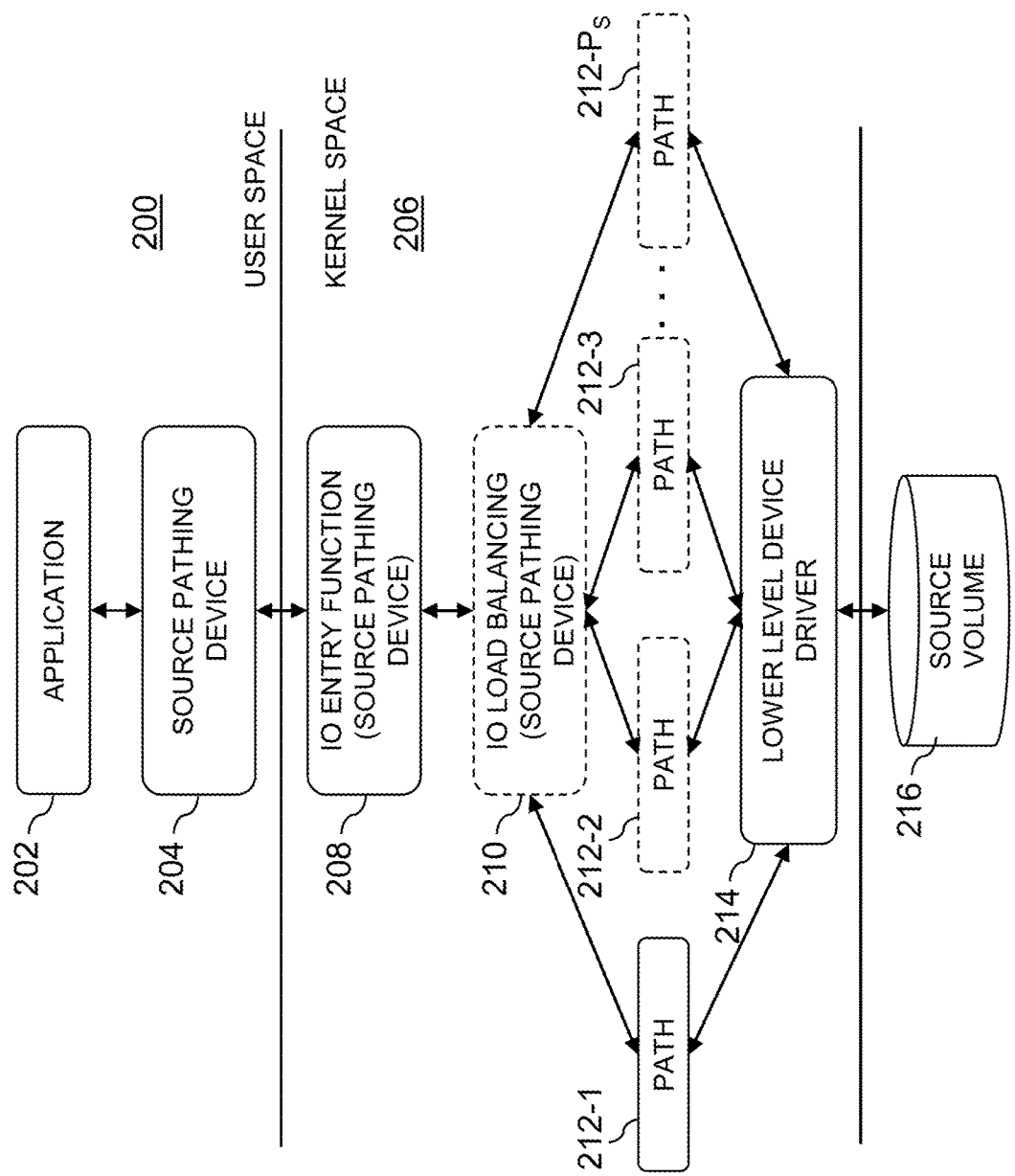
FIG. 2 is a diagram illustrating an example interaction path between a host device and a source volume of a storage system using a source pathing device in an illustrative embodiment.

With reference now to FIG. 2, an example of an IO data flow using a source pathing device according to an illustrative embodiment will now be described with reference also to FIG. 1.

In a user space 200 of a host device 102, an application 202 resident on the host device 102 submits IO operations for processing. The host device 102 selects the IO operations for delivery using a source pathing device 204, establishing communication between application 202 and source pathing device 204. In some embodiments, an MPIO driver 112 of the host device 102 selects the IO operations for delivery using the source pathing device 204.

In a kernel space 206 of the host device 102, an IO entry function 208 of the source pathing device 204 receives the selected IO operations.

Where the source pathing device 204 is part of an MPIO driver 112, the source pathing device 204 submits the selected IO operations to an IO load balancing component 210 of the source pathing device 204. The IO load balancing component 210 performs load balancing, for example, by assigning the IO operations to a number of different paths 212-1, 212-2, 212-3, . . . 212-Ps of the source pathing device 204. For example, if m IO operations are selected, they may be separated out to the paths where, e.g., path 212-1 receives one or more IO operations, path 212-2 receives one or more IO operations, path 212-3 receives one or more IO operations, . . . and path 212-Ps receives one or more IO operations. In some embodiments, a given path may receive no IO operations, all m IO operations, or any portion of the m IO operations. The number of IO operations assigned to each path may be determined, for example, based on the current load on each path, or in any other manner commonly used by MPIO drivers during load balancing.

In some embodiments, for example, where the source pathing device 204 is not part of an MPIO driver 112, for example, when the source pathing device 204 comprises information on a single path, IO load balancing component 210 and paths 212-2, 212-3, . . . 212-Ps are not included and the IO operation is routed through a single path, e.g., path 212-1.

A lower level device driver 214 receives the IO operations from the paths 212, and transfers the IO operations to a corresponding source volume 216 of storage array 105.

Figure 3:
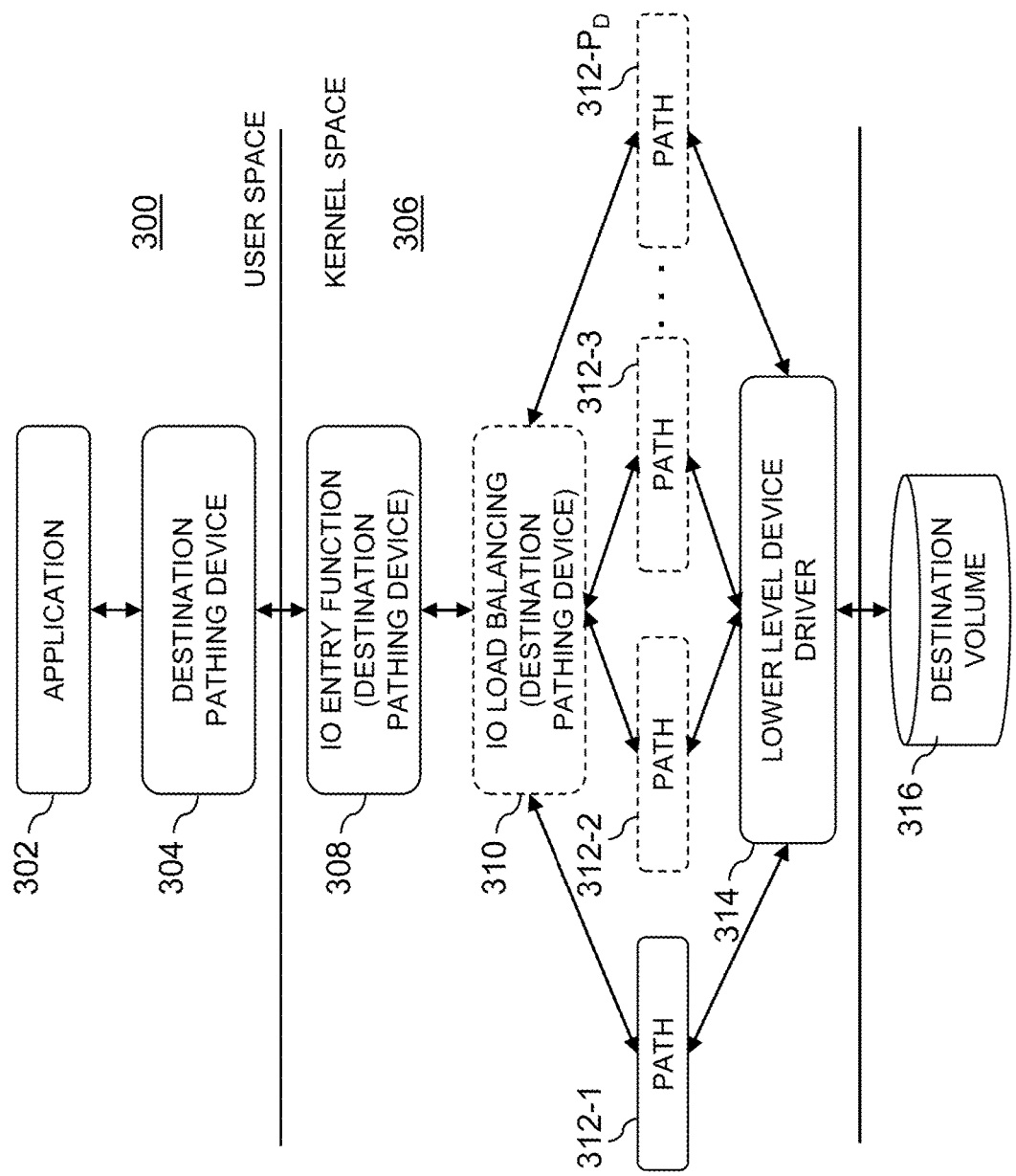
FIG. 3 is a diagram illustrating an example interaction path between a host device and a destination volume of a storage array using a destination pathing device in an illustrative embodiment.

With reference now to FIG. 3, an example of an IO data flow using a destination pathing device according to an illustrative embodiment will now be described with reference also to FIG. 1.

In a user space 300 of a host device 102, an application 302 resident on the host device 102 submits IO operations for processing. The host device 102 selects the IO operations for delivery using a destination pathing device 304, establishing communication between application 302 and destination pathing device 304. In some embodiments, an MPIO driver 112 of the host device 102 selects the IO operations for delivery using the destination pathing device 304.

In a kernel space 306 of the host device 102, an IO entry function 308 of the destination pathing device 304 receives the selected IO operations.

Where the destination pathing device 304 is part of an MPIO driver 112, the destination pathing device 304 submits the selected IO operations to an IO load balancing component 310 of the destination pathing device 304. The IO load balancing component 310 performs load balancing, for example, by assigning the IO operations to a number of different paths 312-1, 312-2, 312-3, . . . 312-$P_D$ of the destination pathing device 304. For example, if m IO operations are selected, they may be separated out to the paths where, e.g., path 312-1 receives one or more IO operations, path 312-2 receives one or more IO operations, path 312-3 receives one or more IO operations, . . . and path 312-P$_D$ receives one or more IO operations. In some embodiments, a given path may receive no IO operations, all m IO operations, or any portion of the m IO operations. The number of IO operations assigned to each path may be determined, for example, based on the current load on each path, or in any other manner commonly used by MPIO drivers during load balancing.

In some embodiments, for example, where the destination pathing device 304 is not part of an MPIO driver 112 and comprises information on only a single path, the IO load balancing component 310 and paths 312-2, 312-3, . . . 312-P$_D$ are not included in the destination pathing device 304, and the IO operation is routed through the single path, e.g., path 312-1.

A lower level device driver 314 receives the IO operations from the paths 312, and transfers the IO operations to a corresponding destination volume 316 of storage array 105.

In illustrative embodiments, with reference to FIGS. 1-5, data migration logic 114 enables a user to migrate data from a source volume to a destination volume with little to no host device downtime or reconfiguration regardless of the pathing software or MPIO driver being used and regardless of the underlying transport protocol.

Data migration comprises two steps:

1) Routing IO operations meant for the source pathing device to the destination pathing device, also called a path flip operation; and 2) Copying data from the source volume to the destination volume.

The disclosed data migration logic 114 implements a path flip operation.

With reference again to FIG. 1, during a typical data migration from a source volume to a destination volume of a storage array 105, an application may issue new IO operations that are targeted at the source volume from a user space. The IO operations are then provided to a kernel IO entry function of a source pathing device associated with the source volume by a host device 102. The IO operations traverse one or more IO paths according to the information contained in the source pathing device and IO load balancing may be performed by the source pathing device, for example, if the source pathing device is a multipath logical device having multiple paths. The IO operations are provided along the paths to a local or a remote storage device comprising the source volume.

In illustrative embodiments, the data migration logic 114 changes the source pathing device's kernel IO entry function in such a way that even though the source pathing device is selected for servicing the IO operations received from the application, the data migration logic 114 also internally routes these IO operations to the destination pathing device's kernel IO entry function. The data migration logic 114 changes the flow at a location that is independent of the pathing device, associated multipath software, and underlying transport protocol, e.g., at the kernel level IO entry functions. Because of this, the data migration logic 114 is able to migrate data from a source volume 216 to a destination volume 316 even when the associated pathing devices 113 use different transport protocols or multipath drivers with little to no host device downtime or reconfiguration.

Completing the migration includes copying the data from the source volume 216 to destination volume 316. The copying of the data is typically achieved using one or more of the following mechanisms:

1. Copying and write cloning at the host (e.g., using a host-based copy engine).

2. Copying and write cloning driven by the destination array (e.g., using an array-based copy engine).

Other copying mechanisms may also or alternatively be used.

Host based migration solutions provide support for data migration among storage devices which are under control of one multipath driver. The migration of data from control of one multipath driver to control of another multipath driver typically requires downtime and reconfiguration of the host device. In addition, if the source and target multipath drivers are not compatible it may be difficult or impossible to migrate the data.

Array based migration solutions use Network Address Authority 6 (NAA6) Identifier (ID) spoofing. In this approach destination storage volumes are programmed with the same NAA6 ID as the source storage volumes. Then these destination storage volumes are mapped to the host device. The multipath driver at the host device adds the destination storage volume paths to the same source volume. Since NVMe devices are not governed by SCSI, the array based NAA6 ID spoofing solution will have less relevance in NVMe based migration solutions.

Illustrative embodiments of the techniques and functionality of data migration logic 114 will now be described in more detail with reference to the flow diagram of FIG. 6.

Figure 5:
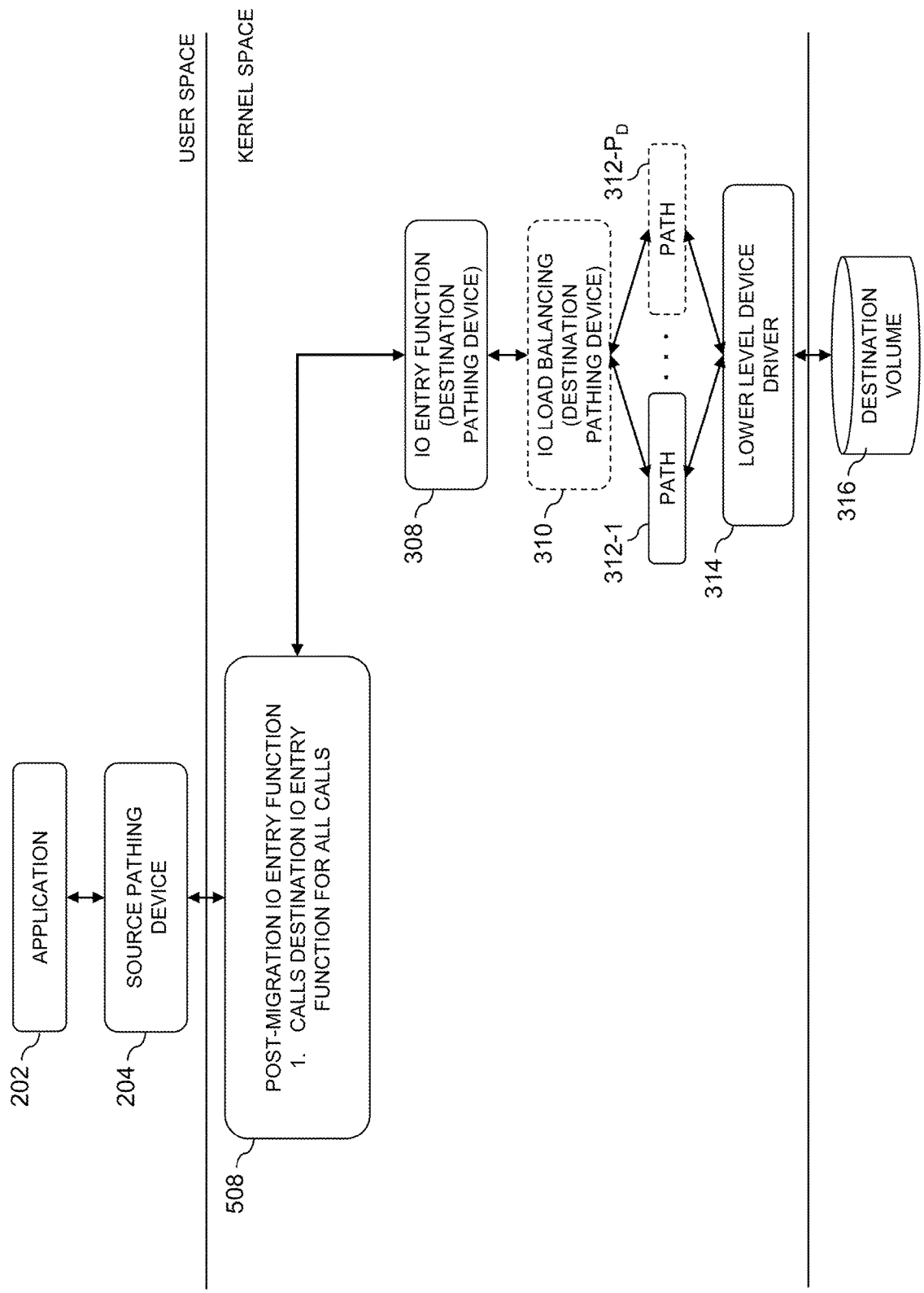
FIG. 5 is a diagram illustrating the replacement of the migration IO entry function of FIG. 4 with a post-migration IO entry function in an illustrative embodiment.
Figure 6:
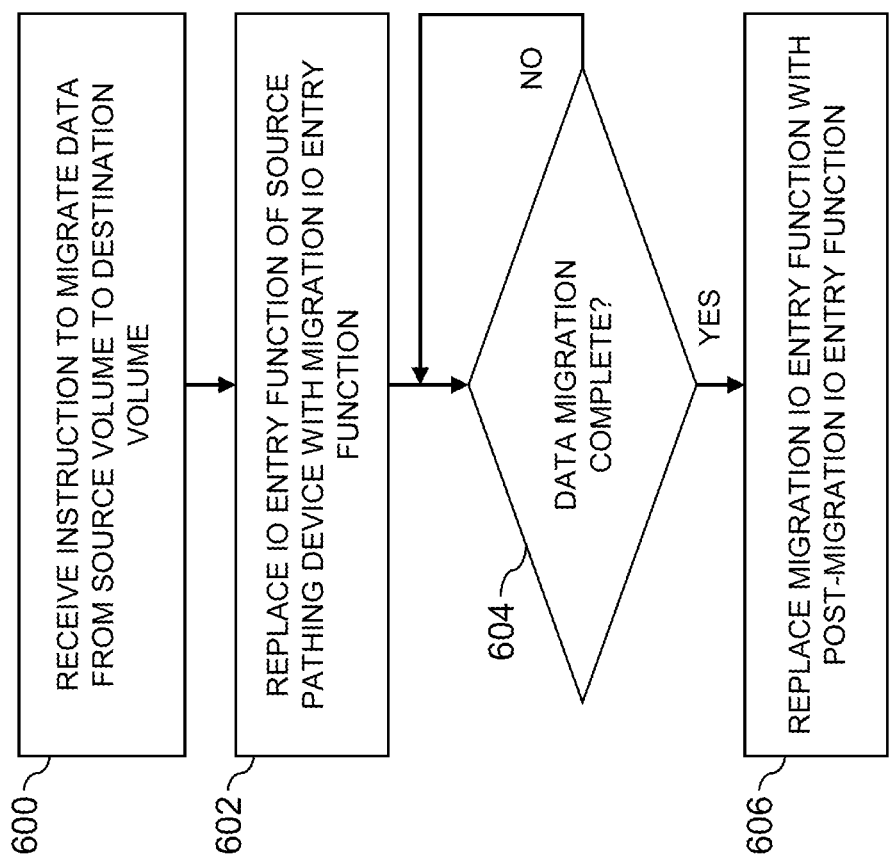
FIG. 6 is a flow diagram of an example process for data migration agnostic of multipath software or underlying transport protocol in an illustrative embodiment.

The process as shown in FIG. 6 includes steps 600 through 606, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes. The process will be described with reference also to FIGS. 1-5.

Initially, the data flow of IO operations from an application 202 on a host device 102 to the source volume 216 may occur as illustrated, for example, in FIG. 2.

At 600, an instruction to migrate data from the source volume 216 to the destination volume 316 is received by the data migration logic 114 of the host device 102, for example, from application 202 in the user space 200. In some embodiments, the instruction contains information which may be utilized by the data migration logic 114 to identify the source pathing device 204 corresponding to the source volume 216 and the destination pathing device 304 corresponding to the destination volume 316. For example, in some embodiments, the information may comprise names or unique identifiers associated with the source and destination volumes.

Figure 4:
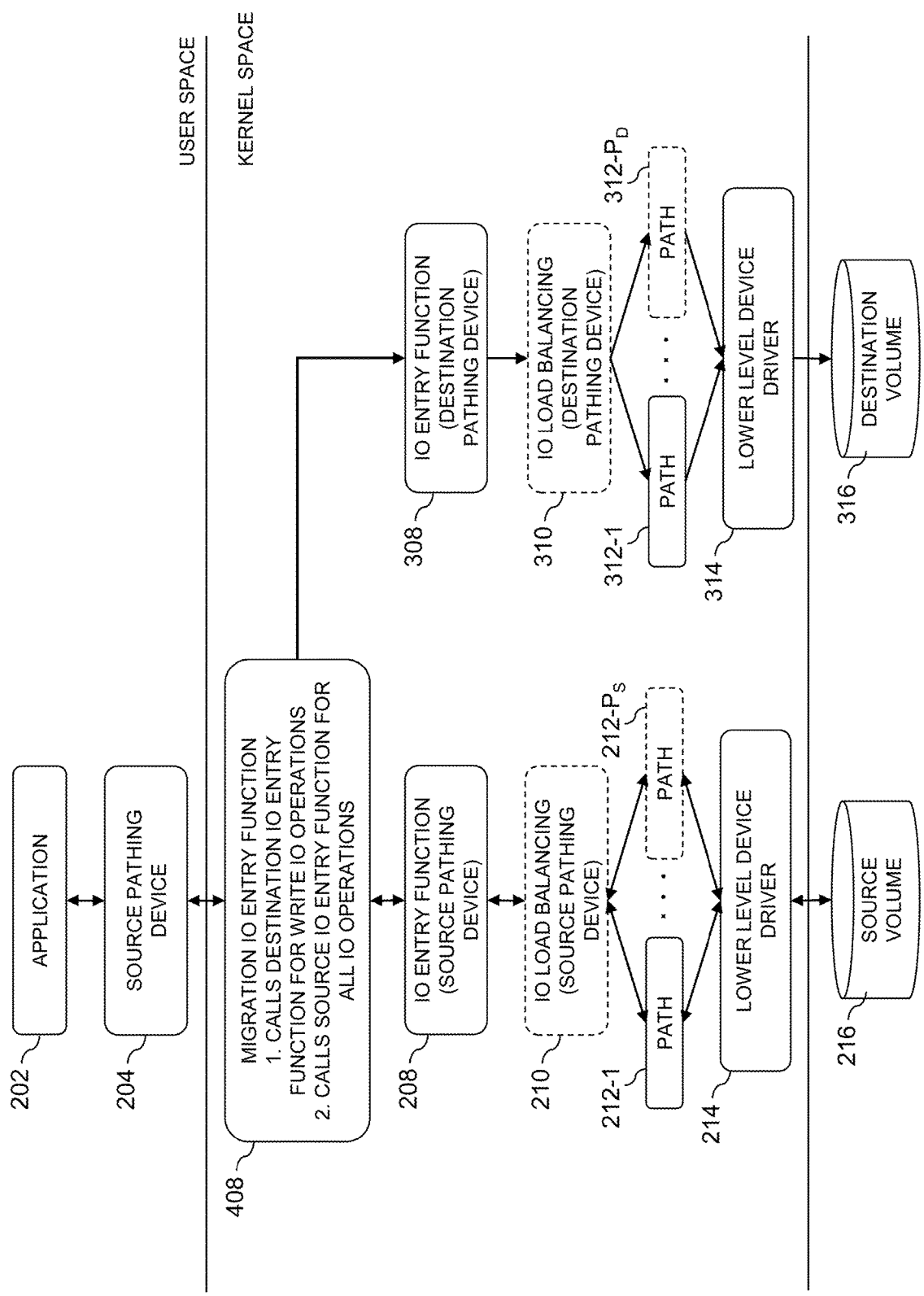
FIG. 4 is a diagram illustrating the replacement of an IO entry function of the source pathing device of FIG. 2 with a migration IO entry function in an illustrative embodiment.

At 602, data migration logic 114 replaces the IO entry function 208 of the source pathing device 204 corresponding to the source volume 216 with a migration IO entry function 408, as illustrated, for example, in FIG. 4. For example, the data migration logic 114 identifies the IO entry function 208 of the source pathing device 204 based on the information contained in the instruction and saves the address of the IO entry function 208 of the source pathing device 204 in memory. The data migration logic 114 also identifies the IO entry function 308 of the destination pathing device 304 based on the information contained in the instruction and saves the address of the IO entry function 308 of the destination pathing device 304 in memory. The data migration logic 114 then replaces the IO entry function 208 of the source pathing device 204 with the new migration IO entry function 408. For example, in some embodiments, the address in the source pathing device 204 that is used to call the IO entry function 208 is replaced with the address of the migration IO entry function 408 such that a call by the source pathing device 204 that is intended for the IO entry function 208 will instead call the migration IO entry function 408 using the address of the migration IO entry function 408.

In illustrative embodiments, the migration IO entry function 408 functions as follows:

1. For IO write operations that are issued to the source pathing device 204, the migration IO entry function 408 calls the destination pathing device 304 using IO entry function 308 and calls the source pathing device 204 using IO entry function 208. The IO entry functions 208 and 308 then handle the IO write operations as described above with reference to FIGS. 2 and 3. In some embodiments, the migration IO entry function 408 may alternatively call the destination pathing device 304 using IO entry function 308 but not the source pathing device 204 using IO entry function 208 for IO write operations issued to the source pathing device 204.

2. For IO read operations that are issued to the source pathing device 204, the migration IO entry function 408 calls the source pathing device 204 using IO entry function 208 but does not call the IO entry function 308 of the destination pathing device 304. The IO entry function 208 then handles the IO read operations as described above with reference to FIG. 2.

As can be seen in FIG. 4, in an illustrative embodiment, the migration IO entry function 408 provides pathing to source volume 216 for both IO read and write operations while also providing pathing to destination volume 316 for IO write operations. This allows new writes received during the data migration to be sent to the destination volume 316 during the data migration in order to prepare the destination volume 316 for an eventual commit operation in conjunction with completion of the data migration.

In conjunction with the replacement of the IO entry function 208 of the source pathing device 204 with the migration IO entry function 408, a copy mechanism is used to migrate the existing data from source volume 216 to destination volume 316. For example, the user may select the copy mechanism to be used, e.g., a host-based copy mechanism, array-based copy mechanism, or any other copy mechanism. In some embodiments, the data migration may be performed in response to the received instruction and the selected copy mechanism may be identified by the information contained in the received instruction.

Referring back to FIG. 6, at 604, data migration logic 114 determines whether the data migration has completed. For example, data migration logic 114 may receive or obtain an indication that the data migration has completed from the host device 102, from SAN 104, or from another source associated with the data migration. If the data migration has not completed, e.g., no indication has been received or obtained, data migration logic 114 may continue waiting until an indication is received or obtained. In some embodiments, for example, data migration logic 114 may be called by the host device 102 automatically once the data migration is complete. In some embodiments, the indication that the data migration is complete may be received from a user of the application, for example, as a command to commit the data migration and perform the path flip operation.

If the data migration logic 114 determines that the data migration is complete, the data migration logic 114 commits the data migration by flipping the path of IO operations that target the source volume from the source volume to the destination volume. For example, at 606, the data migration logic 114 commits the migration by replacing the migration IO entry function 408 with a new post-migration IO entry function 508, for example, as illustrated in FIG. 5. For example, in some embodiments, the address in the source pathing device 204 that is used to call the migration IO entry function 408, which previously replaced the address that was used to call the IO entry function 208 of the source pathing device 204, is now replaced with the address of the post-migration IO entry function 508 such that a call by the source pathing device 204 that is intended for the IO entry function 208 will now call the post-migration IO entry function 508 using the address of the post-migration IO entry function 508 instead of the address of the migration IO entry function 408. Any IO operations targeted at the source pathing device 204 will now execute the post-migration IO entry function 508 and be re-routed to the IO entry function 308 of the destination pathing device 304, for example, as shown in FIG. 5.

The replacement of kernel level IO entry functions allows the data migration logic 114 to support migration of data between source and destination pathing devices under control of any multipath driver or underlying transport protocol (e.g., SCSI or NVMe). Even if the source pathing device, destination pathing device, or both are not in control of a multipath driver the data migration logic 114 will still be able to migrate the data. After completion of the data migration, the source volume 216 and destination volume 316 are synchronized with identical data since the destination volume 316 has received all IO write operations that were issued during the data migration. Because of this, no further iterations are necessary to later copy the IO write operations that were issued during the data migration from the source volume 216 to the destination volume 316 and in addition, no final synchronization involving the temporary suspension of IO operations to complete the synchronization of the source and destination volumes will be necessary.

Responsive to receiving or obtaining the indication that the data migration is completed, and in some embodiments after performing the commit of the data migration and replacing the migration IO entry function 408 with the post-migration IO entry function 508, the host device 102 or MPIO driver 112 that includes the source pathing device 204 may be inhibited or blocked from accessing the source pathing device 204. This inhibiting or blocking is sometimes referred to as blacklisting the source pathing device for the host device 102 or MPIO driver 112. For example, the host device 102 or MPIO driver 112 may not be able to access the source pathing device 204 and instead will be routed to the destination pathing device 304.

In some embodiments, information about the data migration is saved, e.g., in a file or database. The information may include, for example, relationship information between the source and destination pathing devices. For example, in some embodiments, the information may be stored as an entry in a database that includes migration relationships. The entry may take the form of a tuple that includes <source pathing device information>, e.g., address information or other similar information about the source pathing device 204, and corresponding <destination pathing device information>, e.g., address information or other similar information about the destination pathing device 304.

Illustrative embodiments of the techniques and functionality of data migration logic 114 after a reboot of a host device will now be described in more detail with reference to the flow diagram of FIG. 7.

Figure 7:
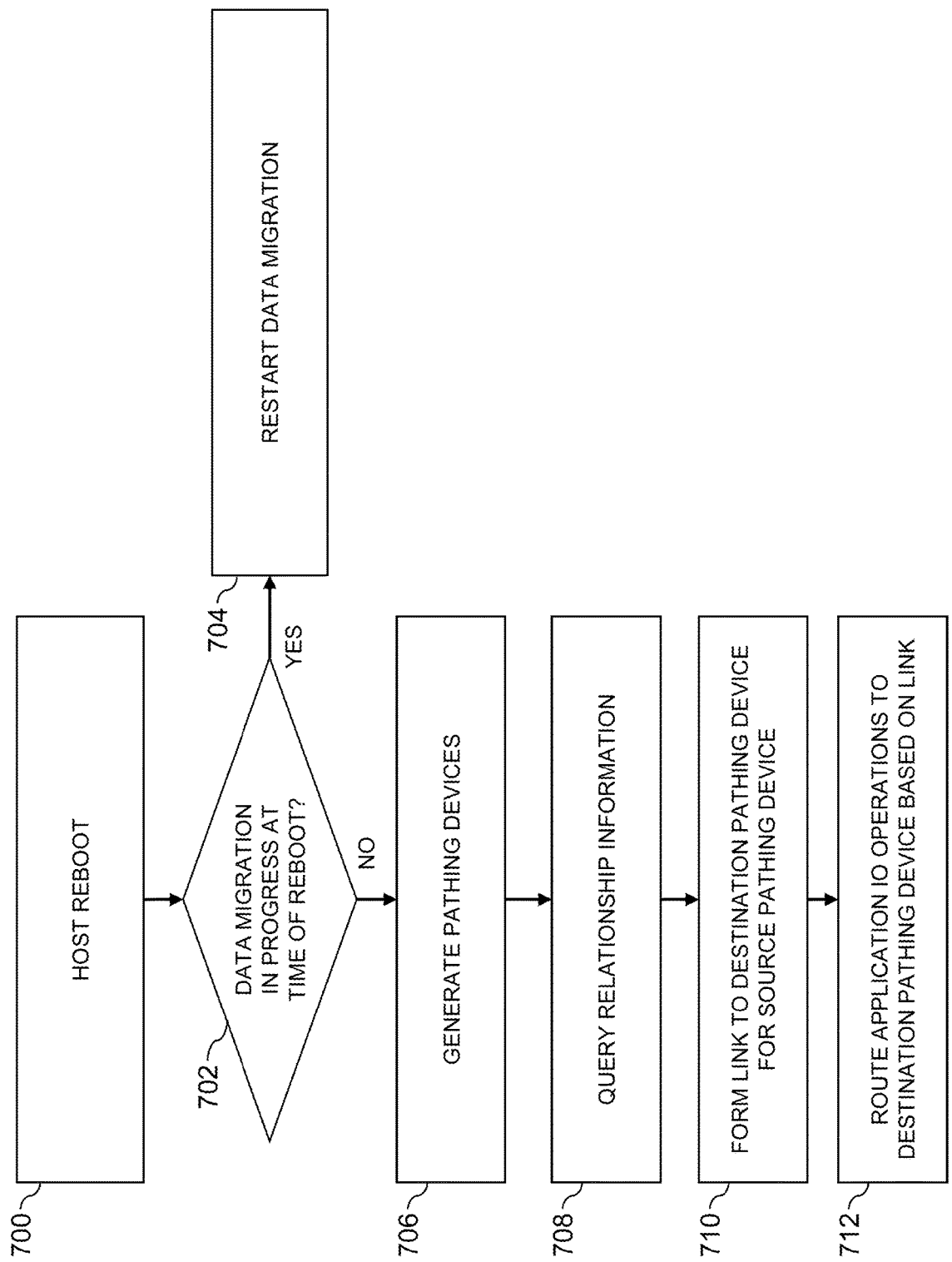
FIG. 7 is a flow diagram of an example process for data migration agnostic of multipath software or underlying transport protocol after a host reboot in an illustrative embodiment.

The process as shown in FIG. 7 includes steps 700 through 712, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes. The process will be described with reference also to FIGS. 1-5.

A host reboot may occur at any time during the data migration process. The data migration logic 114 handles host reboots as follows:

At 700, the host reboots.

At 702, data migration logic 114 determines whether a data migration was in progress at the time that the host rebooted, e.g., data was being transferred from the source volume to the destination volume but the commit and path flip had not yet occurred. If a data migration was in progress, data migration logic 114 restarts the data migration at 704, otherwise the process moves to 706.

At 706, if a data migration was not in progress, pathing software such as, e.g., an MPIO driver 112 or other pathing software implemented by a host device 102, generates pathing devices, for example, by scanning for added or removed logical volumes, storage devices, etc., as described above. If the source pathing device 204 is blacklisted from the pathing software as described above, the source pathing device 204 will not be formed by the pathing software. Instead, on reboot, the destination pathing device 304 will be formed, e.g., by the same pathing software, another pathing software, another host device 102, or in another manner.

At 708, data migration logic 114 queries the saved relationship information in response to formation of the destination pathing device 304 to obtain the source pathing device information. For example, data migration logic 114 may use the destination pathing device information as a key to find the corresponding source pathing device information.

At 710, data migration logic 114 uses the obtained source pathing device information to form a link in the host device 102 to the destination pathing device 304 for any calls to the source pathing device 204.

At 712, an application attempting to issue an IO operation to the source pathing device 204 will automatically follow the link to the destination pathing device 304 and will start using the destination pathing device 304 instead of the source pathing device 204 for these IO operations. For example, while the application may still believe that the source pathing device 204 is servicing the IO requests, the host device 102 and data migration logic 114 automatically re-route these IO operations to the destination pathing device 304 using the formed link.

In illustrative embodiments, a single path device may be used for one or both of the source pathing device 204 and destination pathing device 304. In such embodiments, the single path device may be mounted to the source volume 216 or destination volume 316 on the basis of a filesystem universally unique identifier (UUID). For example, the filesystem UUID of the single path device may be included as the part of the data stored on the source volume 216. During migration of the data from the source volume 216 to the destination volume 316, data migration logic 114 does not copy the UUID for the single path device to destination volume 316. In conjunction with the commit operation, data migration logic 114 copies the UUID of the single path device from source volume 216 to the destination volume 316 and removes the UUID of the single path device from source volume 216 such that, after the commit operation, the UUID of the single path device is only present in destination volume 316.

In conjunction with a reboot after the migration has completed and the commit operation has been executed, the application 202 automatically begins using the destination volume 316 based on the UUID of the single path device since the UUID is only present on the destination volume 316. In such embodiments, data migration logic 114 may also implement some or all of the steps of the process shown in FIG. 7 in conjunction with a reboot, where necessary.

In some embodiments, additional types of communications may be received from an application that are not IO read or write operations. For example, an application may issue a command using an IO control (IOCTL) interface that is specific to a particular device. These communications may be sent to the source pathing device 204 by application 202 even after the path flip operation has occurred since they do not utilize the IO entry functions described above for communication. In such a case, data migration logic 114 is configured to intercept these communications and route them to the destination pathing device 304.

In some embodiments, for example, data migration logic 114 may translate these communications from a format specific to the source pathing device 204 into a format specific to the destination pathing device 304. For example, IOCTL commands that are specific to the source pathing device 204 may be translated by the data migration logic 114 into IOCTL commands that are specific to the destination pathing device 304. The translation may or may not be required depending on the nature of the device and the underlying transport protocols that are used for communications. For example, in some embodiments, both the source and destination pathing devices may utilize the same protocol for these communications.

In some embodiments, any response from the destination pathing device 304 may be translated by data migration logic 114 back into the format used by the source pathing device 204, if necessary, so that a response to the command may be provided to the application in the same format as the received command.

Separate instances of the processes of FIGS. 6 and 7 may be performed in respective additional host devices that share the storage array.

The particular processing operations and other system functionality described in conjunction with the flow diagrams of FIGS. 6 and 7 are presented by way of illustrative example only, and should not be construed as limiting the scope of the disclosure in any way. Alternative embodiments can use other types of processing operations involving host devices, storage systems and data migration logic. For example, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different data migration logic arrangements within a given information processing system.

Functionality such as that described in conjunction with the flow diagrams of FIGS. 6 and 7 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for migrating data in a storage system are carried out at least in part under the control of its data migration logic 114. For example, data migration logic 114 is illustratively configured to control performance of portions of the process shown in the flow diagrams described above in conjunction with FIGS. 6 and 7.

As indicated previously, absent use of the functionality for data migration as disclosed herein, host device downtime or reconfiguration is often required to complete a data migration. This leads to inefficiencies in the storage system as well as in the host device performing the data migration.

Such drawbacks are advantageously overcome in illustrative embodiments herein by utilization of data migration logic 114 to implement functionality for migrating data in a manner that is agnostic of any pathing software or underlying transport protocols as described above. For example, by replacing the IO entry function associated with the source pathing device 204 at the kernel level, data migration logic 114 may re-route IO operations to the destination pathing device 304 during the data migration such that upon completion of the data migration, the destination volume 316 is already synchronized with the source volume 216 including any new IO operations that were received during the data migration without requiring host device downtime or reconfiguration for final synchronization.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the data migration logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, data migration logic and additional or alternative components. Also, the particular configurations of system and device elements and associated processing operations illustratively shown in the drawings can be varied in other embodiments. For example, a wide variety of different MPIO driver configurations and associated data migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one host device comprising a processor coupled to memory;
   the host device being configured to communicate over a network with at least one storage system comprising a source volume and a destination volume;
   wherein the host device is further configured:
      responsive to an instruction to migrate data from the source volume to the destination volume, to replace a kernel-based input-output entry function of a source pathing device associated with the source volume with a kernel-based migration input-output entry function, the migration input-output entry function being configured, in response to receiving an input-output operation directed to the input-output entry function of the source pathing device during the migration of the data from the source volume to the destination volume:
         to call a kernel-based input-output entry function of a destination pathing device associated with the destination volume; and
         to call the input-output entry function of the source pathing device; and
      responsive to an indication that a migration of data from the source volume to the destination volume has completed, to replace the migration input-output entry function with a kernel-based post-migration input-output entry function, the post-migration input-output function being configured to call the input-output entry function of the destination pathing device in response to receiving an input-output operation directed to the input-output entry function of the source pathing device;
      wherein the input-output entry function of the source pathing device, the input-output entry function of the destination pathing device, the migration input-output entry function, and the post-migration input-output entry function are each implemented at a kernel level of the at least one host device.

2. The apparatus of claim 1 wherein the migration input-output entry function is configured to call the input-output entry function of the source pathing device but not the input-output entry function of the destination pathing device in response to receiving an input-output operation that is a read operation.

3. The apparatus of claim 1 wherein the post-migration input-output entry function is configured to call the input-output entry function of the destination pathing device for both received input-output write operations and received input-output read operations.

4. The apparatus of claim 1 wherein the source pathing device is under control of a first multipath input-output driver and the destination pathing device is under control of a second multipath input-output driver that is different than the first multipath input-output driver.

5. The apparatus of claim 1 wherein the source pathing device is not under control of a multipath input-output driver and the destination pathing device is under control of a multipath input-output driver.

6. The apparatus of claim 1 wherein the source pathing device is under control of a multipath input-output driver and the destination pathing device is not under control of a multipath input-output driver.

7. The apparatus of claim 1 wherein the source pathing device and the destination pathing device are configured to communicate using different transport protocols.

8. The apparatus of claim 7 wherein one of the source pathing device and destination pathing device is configured to communicate using a small computer system interface (SCSI) transport protocol, and the other of the source pathing device and destination pathing device is configured to communicate using a non-volatile memory express (NVMe) transport protocol.

9. The apparatus of claim 1 wherein the host device is further configured:
   responsive to the indication that the migration of data from the source volume to the destination volume has completed, to store a relationship between the source pathing device and the destination pathing device in a memory associated with the at least one host device; and
   responsive to a reboot of the at least one host device, to form a link in association with the source pathing device based on the relationship, the link configured to re-route input-output operations targeted at the source pathing device to the destination pathing device.

10. The apparatus of claim 1 wherein responsive to the indication that the migration of data from the source volume to the destination volume has completed, the at least one host device is further configured:
to intercept communications, from an application targeting the source pathing device, that are not input-output read or write operations; and
to route the intercepted communications to the destination pathing device.

11. The apparatus of claim 10 wherein routing the intercepted communications comprises translating the intercepted communications.

12. The apparatus of claim 11 wherein the intercepted communications are communicated by the application using a first input-output control interface associated with the source pathing device that is different than a second input-output control interface associated with the destination pathing device, the translating comprising translating the intercepted communications from the first input-output control interface to the second input-output control interface.

13. The apparatus of claim 12 wherein the at least one host device is further configured to route other communications, that are responsive to the intercepted communications, from the destination pathing device to the application, the routing of the other communications comprising translating the other communications from the second input-output control interface to the first input-output control interface.

14. A method comprising:
responsive to an instruction to migrate data from a source volume of at least one storage system to a destination volume of the at least one storage system, replacing a kernel-based input-output entry function of a source pathing device associated with the source volume with a kernel-based migration input-output entry function, the migration input-output entry function being configured, in response to receiving an input-output operation directed to the input-output entry function of the source pathing device during the migration of the data from the source volume to the destination volume:
to call a kernel-based input-output entry function of a destination pathing device associated with the destination volume; and
to call the input-output entry function of the source pathing device; and
responsive to an indication that a migration of data from the source volume to the destination volume has completed, replacing the migration input-output entry function with a kernel-based post-migration input-output entry function, the post-migration input-output being function configured to call the input-output entry function of the destination pathing device in response to receiving an input-output operation directed to the input-output entry function of the source pathing device;
wherein the input-output entry function of the source pathing device, the input-output entry function of the destination pathing device, the migration input-output entry function, and the post-migration input-output entry function are each implemented at a kernel level of at least one host device;
wherein the method is implemented by the at least one host device, the at least one host device comprising a processor coupled to a memory.

15. The method of claim 14 wherein:
the migration input-output entry function is configured to call the input-output entry function of the source pathing device but not the input-output entry function of the destination pathing device in response to receiving an input-output operation that is a read operation; and
the post-migration input-output entry function is configured to call the input-output entry function of the destination pathing device for both received input-output write operations and received input-output read operations.

16. The method of claim 14 wherein the source pathing device is under control of a first multipath input-output driver and the destination pathing device is under control of a second multipath input-output driver that is different than the first multipath input-output driver.

17. The method of claim 14 wherein one of:
the source pathing device is not under control of a multipath input-output driver and the destination pathing device is under control of a multipath input-output driver; and
the source pathing device is under control of a multipath input-output driver and the destination pathing device is not under control of a multipath input-output driver.

18. A computer program product comprising a non-transitory processor-readable storage medium having stored therein program code of one or more software programs, wherein the program code, when executed by at least one host device comprising a processor coupled to a memory, causes the at least one host device:
responsive to an instruction to migrate data from the source volume to the destination volume, to replace a kernel-based input-output entry function of a source pathing device associated with the source volume with a kernel-based migration input-output entry function, the migration input-output entry function being configured, in response to receiving an input-output operation directed to the input-output entry function of the source pathing device during the migration of the data from the source volume to the destination volume:
to call a kernel-based input-output entry function of a destination pathing device associated with the destination volume; and
to call the input-output entry function of the source pathing device; and
responsive to an indication that a migration of data from the source volume to the destination volume has completed, to replace the migration input-output entry function with a post-migration input-output entry function, the post-migration input-output function being configured to call the input-output entry function of the destination pathing device in response to receiving an input-output operation directed to the input-output entry function of the source pathing device;
wherein the input-output entry function of the source pathing device, the input-output entry function of the destination pathing device, the migration input-output entry function, and the post-migration input-output entry function are each implemented at a kernel level of the at least one host device.

19. The computer program product of claim 18 wherein:
the migration input-output entry function is configured to call the input-output entry function of the source pathing device but not the input-output entry function of the destination pathing device in response to receiving an input-output operation that is a read operation; and the post-migration input-output entry function is configured to call the input-output entry function of the destination pathing device for both received input-output write operations and received input-output read operations.

20. The computer program product of claim 18 wherein the source pathing device is under control of a first multipath input-output driver and the destination pathing device is under control of a second multipath input-output driver that is different than the first multipath input-output driver.

\* \* \* \* \*